(12) United States Patent
Fitzgerald et al.

(10) Patent No.: US 8,613,014 B2
(45) Date of Patent: Dec. 17, 2013

(54) TELEVISION DISPLAYED MESSAGING

(75) Inventors: Deborah S. Fitzgerald, Superior, CO (US); Ike Elliott, Broomfield, CO (US); Frank Sandoval, Louisville, CO (US); Carey Sonsino, Golden, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 58 days.

(21) Appl. No.: 13/287,346

(22) Filed: Nov. 2, 2011

(65) Prior Publication Data
US 2013/0107117 A1    May 2, 2013

(51) Int. Cl.
| | |
|---|---|
| *H04N 7/173* | (2011.01) |
| *H04N 11/20* | (2006.01) |
| *H04N 11/00* | (2006.01) |
| *H04N 7/00* | (2011.01) |
| *H04N 5/44* | (2011.01) |
| *H04N 5/46* | (2006.01) |
| *H04N 5/445* | (2011.01) |
| *H04N 9/74* | (2006.01) |
| *G06F 3/00* | (2006.01) |
| *G06F 15/16* | (2006.01) |
| *H04W 4/00* | (2009.01) |

(52) U.S. Cl.
USPC ............. 725/34; 348/441; 348/468; 348/473; 348/553; 348/558; 348/563; 348/589; 719/321; 709/206; 455/466

(58) Field of Classification Search
USPC ............ 725/34, 110; 348/441, 468, 473, 553, 348/555, 558, 563, 589; 719/328, 311, 719/313–319, 321; 709/230, 232, 206; 455/466
See application file for complete search history.

(56) References Cited

U.S. PATENT DOCUMENTS

| | | | |
|---|---|---|---|
| 7,805,746 B2 * | 9/2010 | Brandyberry et al. ........ 725/110 |
| 8,266,223 B2 * | 9/2012 | Daigle ............................ 709/206 |
| 8,369,055 B2 * | 2/2013 | Cvorovic et al. ............... 361/78 |
| 2003/0074410 A1 * | 4/2003 | Kay et al. ....................... 709/206 |
| 2008/0216137 A1 * | 9/2008 | Van Der Heijden .......... 725/110 |
| 2009/0069038 A1 * | 3/2009 | Olague et al. .................. 455/466 |
| 2009/0157816 A1 * | 6/2009 | Pattan ............................. 709/206 |
| 2009/0187831 A1 * | 7/2009 | Tiwana et al. ................. 715/752 |
| 2009/0210907 A1 * | 8/2009 | Fox et al. ......................... 725/46 |
| 2010/0037277 A1 * | 2/2010 | Flynn-Ripley et al. ....... 725/110 |
| 2011/0090898 A1 * | 4/2011 | Patel et al. ...................... 370/352 |
| 2011/0246620 A1 * | 10/2011 | Miller, Jr. ...................... 709/219 |
| 2011/0282949 A1 * | 11/2011 | Rivkin ........................... 709/206 |
| 2011/0283010 A1 * | 11/2011 | Parchman et al. ............. 709/231 |
| 2012/0084825 A1 * | 4/2012 | Sharma et al. ................ 725/109 |
| 2012/0096503 A1 * | 4/2012 | Slothouber et al. ............ 725/110 |
| 2012/0143976 A1 * | 6/2012 | Lindquist ...................... 709/206 |
| 2013/0031192 A1 * | 1/2013 | Caspi ............................. 709/206 |
| 2013/0172026 A1 * | 7/2013 | Odell et al. .................... 455/466 |

\* cited by examiner

*Primary Examiner* — Haong-Vu A Nguyen-Ba
(74) *Attorney, Agent, or Firm* — Great Lakes Intellectual Property, PLLC.

(57) ABSTRACT

A method and system is contemplated for television displayed messaging. The television displayed messaging may be facilitated with an automated process for selecting an adapter suitable for use in formatting to be displayed messages according to operating requirements of the television. The television displayed messaging may be implemented as a one-way, downstream process such that the television or a user agent associated therewith need not overload upstream communications in order to receive and display messages.

20 Claims, 3 Drawing Sheets

TELEVISION DISPLAYED MESSAGING

TECHNICAL FIELD

The present invention relates to television displayed messaging, such as but not limited to displaying messages originating from a non-television related device on a television.

BACKGROUND

With the increasing number of mobile devices having full-time access to the Internet over wireless networks, cellular networks, etc., the convenient use of those devices to conduct activities over the Internet can conflict with less mobile devices, such as set top boxes (STBs), televisions, as the user's desire to interact with the less mobile devices may be compromised due to the those devices being less conveniently operated than the more mobile devices (i.e., the user may need to be at the relatively static location of the less mobile device). In order to avert this conflict, the inventors of the present invention believe it may be advantageous to enable the more mobile devices to control or otherwise direct activities of the less mobile devices so that the convenience of the mobile devices can be shared with the less mobile devices. One difficulty in achieving this shared-convenience resides in the inability, or undesirability, of the less mobile devices to execute two-way data communications, such as those typically carried out by the more mobile devices over the Internet or their other non-proprietary network.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
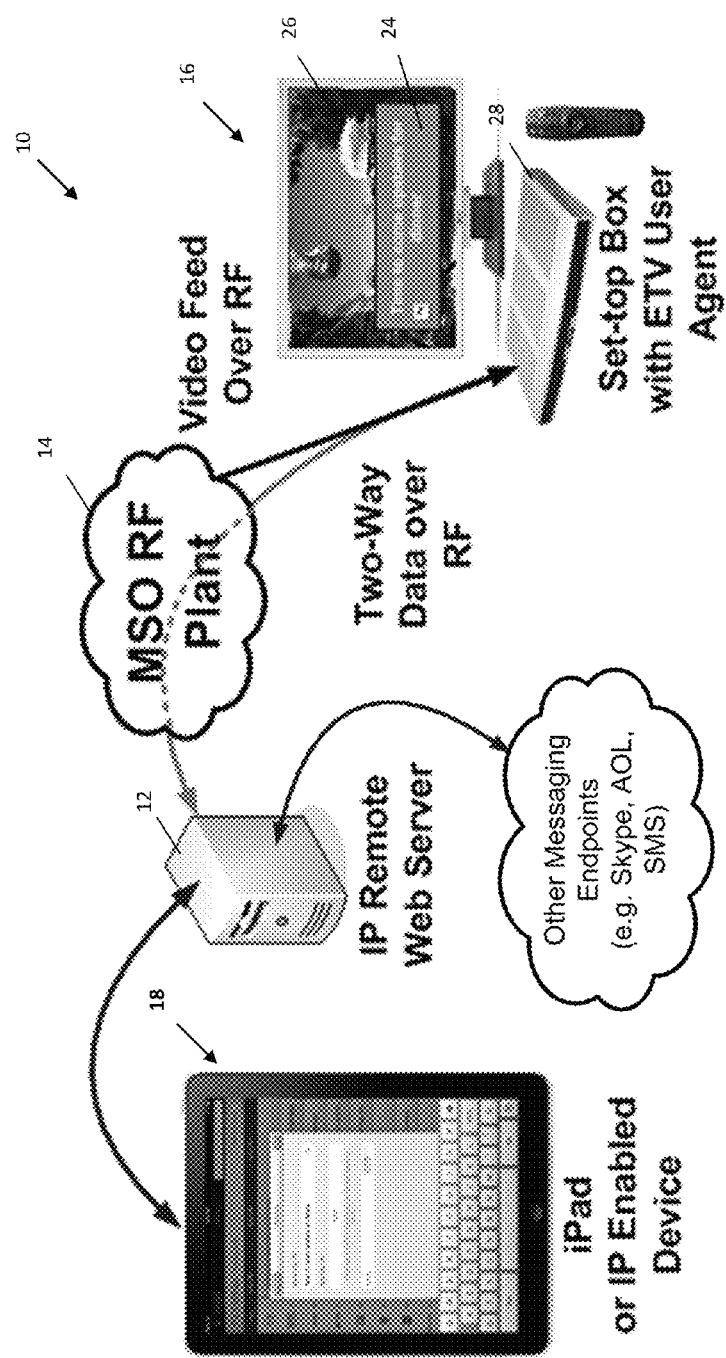
FIG. 1 illustrates a television messaging system as contemplated by one non-limiting aspect of the present invention.

FIG. 1 illustrates a television messaging system 10 as contemplated by one non-limiting aspect of the present invention. The system 10 is shown to include a server 12 operable to facilitate communications over a network 14 between a service provider device 16 and a consumer device 18 or other messaging endpoint/application (e.g., Skype, AOL, and SMS), which are commonly referred to as consumer devices. The communications may be sufficient to support messaging related signaling necessary to facilitate displaying messages originating from one of the consumer devices 18 at and/or through the service provider device 16. The ability to display messages at the service provider device 16 based on commands issued from the consumer device 18 may be beneficial in enhancing customer satisfaction by allowing customers an ability to send messages to people using the service provider device 16 within their home.

The service provider (not shown) associated with the device 16 may be a multiple system operator (MSO), such as but not limited to a broadcast, satellite, or cable television service provider, a telecommunications operator, such as but not limited to a cellular or wireless telephone provider, and/or other provider of electronic services, such as but not limited to a video/content download or streaming service provider. The service provider may divide the network 14 into a proprietary network and a non-proprietary network. The non-proprietary network may be configured to support unsecured and/or non-proprietary communications with the consumer device 18, such as those carried out over the Internet through wireless or wireline communications. The proprietary network may be configured to support secured and/or proprietary communications with the service provider device 16, such as those carried out over a cable television line or other medium through which proprietary signaling is required to facilitate communications.

The consumer device 18 may be a mobile device, a mobile phone, a tablet PC, a laptop, and the like. While not required, the consumer device 18 may be operable to facilitate IP-based communications over the Internet or over other non-proprietary networks such that the consumer device may be characterized as an IP-enabled device. The consumer device 18 may be configured to support standard, open source, or non-proprietary communications with the server 12. The consumer device 18 may move ubiquitous between network access points such that communications may be instigated with the server 12 without having to be authenticated. The present invention contemplates the server facilitating message delivery from the consumer device 18 in a manner that allows the messages to be delivered to the service provider device 16 from virtually any type of consumer device 18 having capabilities to communicate with the server 12, e.g., an IP-enabled device.

The service provider device 16 may be a set-top box (STB), a digital video recorder (DVR), a media terminal adapter (MTA), a modem, a television having an integrated STB, or other device through which service provider related services may be accessed. The service provider device 16, at least in this regard, may be considered to be within the control or supervised domain of the service provider in that the device 16 may require proprietary communications or other proprietary controls and/or a dedicated communication medium in order to facilitate access to the service provider services. The service provider device 16 may be limited to communicating with the service provider and/or the server 12, as opposed to directly with the consumer device 18 over public or non-proprietary mediums, due to the proprietary nature of the communications and interactions between the service provider and the service provider device 16. This type of restriction may prevent the service provider device 16 from displaying messages unless the messages are routed through the service provider.

The service provider device 16 may be configured to support one-way and/or two-way communications with the service provider. The two-way communications may be utilized to facilitate the service provider device 16 issuing requests to display messages originating from the consumer device 18, such as to facilitate targeted advertising, news feeds, and the like. In the event two-way communications unnecessarily overload or burden an upstream indication path from the service provider device 16 to the service provider, one-way communications may instead be utilized. The one-way communications may correspond with the consumer device 18 issuing messages to the service provider device 16 without being requested by the service provider device 16 to provide the messages or without otherwise requiring communications from the service provider device 16. This capability may be similar to Short Message Service (SMS) or Multimedia Messaging Service (MMS) text messaging where instant messages may be delivered to a recipient without the recipient requesting or otherwise pre-approving receipt of the message.

The present invention contemplates facilitating display of virtually any type of message at the service provider device 16. For exemplary non-limiting purposes, the present invention is predominately described with respect to television displayed messaging where a requested or unsolicited message 24 is displayed through a television 26, such as through a STB 28 connected to the television or through another feature integrated within the television. This arrangement is particularly problematic since it requires the messages to be delivered through proprietary mediums used to facilitate services through the service provider device 16. The proprietary mediums may require specific signaling protocols and messaging formats in order to properly communicate with the service provider device 16. This arrangement may also be problematic with servicing multiple service provider devices 16 since one or more of the service provider devices 16 may have disparate operating requirements and/or applications for displaying messaging.

The illustration provided in FIG. 1 demonstrates one television messaging display scenario where the message 24 is overlaid over television signaling while the television signaling is showing within the television 26. The message 24 may be displayed as a plurality of alphanumeric characters within a messaging box. An application operating on the television 26 and/or the STB 28, which are collectively referred to herein as that service provider device 16, may be instructed to display the particular alphanumeric characters according to instructions included within a data resource transmitted from the server 12 in response to receipt of a corresponding message from the consumer device 18. The message may be displayed while the television signaling is being normally output such that the message and the television signaling are simultaneously played. In the event the message includes audio or other media, the television signaling may be edited or otherwise adjusted to output the desired message. Optionally, the television signaling may be paused or frozen while the message 24 is displayed.

The displayed message 24 may include selectable menus, buttons or other user input fields through which a user input may be received. The user inputs may be received to communicate user responses to the displayed message, to order advertised products, and/or to confirm receipt or otherwise acknowledge the message. One non-limiting aspect of the present invention contemplates notifying a user that "dinner is ready" or to provide some other type of message for which immediate action is desired. To confirm receipt of the message and/or its urgency, the television signaling may be frozen or otherwise interrupted by the displayed message 24 in order to force the user to enter a responsive user input, such as to indicate that the user "is on their way" or to provide an estimated time of arrival. Of course, the present invention is not necessary limited to this exemplary communication scheme and fully contemplates facilitating any type of messaging dependent communication.

The present invention contemplates facilitating television displayed messaging on the belief that television service subscribers, or other subscribers to service providers which deliver services to dedicated devices included within various positions within a home or other location, may be particularly interested in an ability to communicate messages to the various service provider devices 16 based on messaging originating from a non-subscriber dependent device, such as to facilitate text messaging from a mobile phone or tablet PC to users the service provider devices and/or to facilitate multicast or unicast messaging. The originating message may include features for individually or collectively specifying the recipients and/or service provider devices 16 intended to receive the messages so that messages can be targeted to specific individuals and/or service provider devices 16. Optionally, in addition to directing the service provider devices to display messages, the messages may also specify instructions or other executable operations to be conducted by the service provider device, such as to change a channel, instigated a recording, or launch video-on-demand (VOD).

Figure 2:
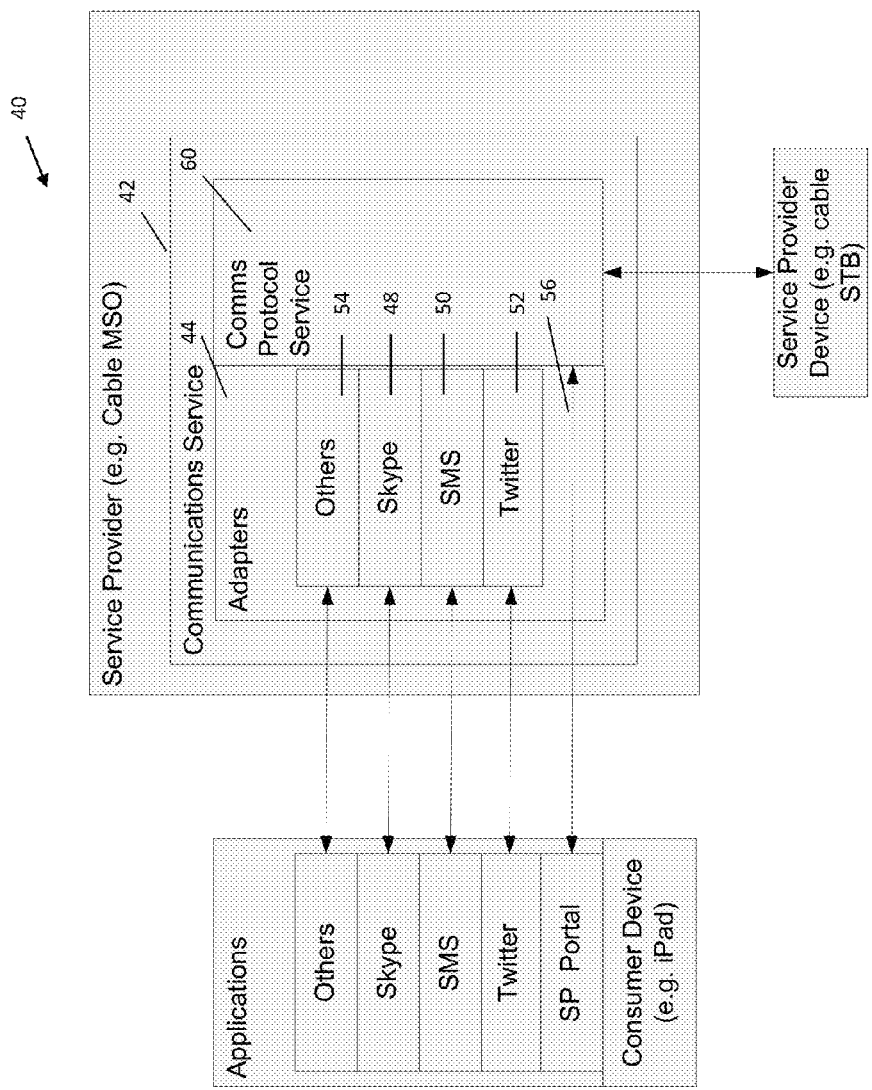
FIG. 2 illustrates an adapter-based architecture as contemplated by one non-limiting aspect of the present invention.

The proprietary or provider specific control requirements of the service provider devices 16 present particular difficulties in facilitating message delivery between the consumer devices 18 and the service provider devices 16. One non-limiting aspect of the present invention contemplates ameliorating these difficulties by abstracting the proprietary communications mechanisms from the messaging service. FIG. 2 illustrates an adapter-based architecture 40 as contemplated by one non-limiting aspect of the present invention. The adapter-based architecture 40 may be beneficial in facilitating message translation and/or other formatting or packaging requirements necessary to facilitate communications between the consumer devices 18 and the service provider devices 16. The adapter-based architecture 40 may be particularly beneficial to facilitate communications given the inability of the consumer devices 18 to directly communicate with the service provider devices 16 due to the dependencies of the service provider devices 16 to the proprietary communication and control restraints of the service provider.

The adapter-based architecture 40 is described for exemplary non-limiting purposes with respect to the consumer device 18 being a tablet PC operable to support a plurality of resident applications where a user of the tablet PC desires to communicate a message to a service provider device 16 configured as a cable STB 28. The cable STB 28 may be a limited capability device such that the STB 28 may be unable to execute or otherwise implement at least some of a plurality of applications on the same operating system or platform as the consumer device 18, i.e., in a manner that allows applications to communicate with each other. Because the STB 28, or more particularly the applications residing on the STB 28, may be incompatible with the applications residing on the consumer device 18 and/or an operating system or platform as the consumer device 18, the consumer device 18 may be prevented from directly communicating messages to the STB 28 for display. The present invention contemplates ameliorating this difficulty with the use of a communications service 42 having the adapter-based architecture 40.

The communication service 42 may be included or configured as part of the server 12 or an entity associated with the service provider. The communication service 42 may be a device having a processor and a computer-readable storage medium that cooperate to facilitate the logical operations and other processes contemplated or necessary to facilitate implementing the functionality of the present invention. The communication service 42 may be configured as an interface between the public domain of the tablet PC 18 and the private domain of the STB 28 (the tablet PC 18 may be considered to be part of a public domain in that communication therewith may take place over public mediums and/or without restriction/permission from the service provider whereas the STB 28 may be considered as part of a private domain since communications therewith must be authorized or otherwise facilitated by the service provider, i.e., a private entity).

The communication service 42 may include an adapter 44 having a plurality of adapters configured to translate or otherwise manipulate signaling from corresponding applications of the tablet PC 18 into a format suitable for transmission and use by the STB 28. In the event the STB 28 is configured to support Enhanced TV Binary Interchange Format (EBIF), tru2way, OpenCable Application Platform (OCAP), or other types of STB-based application and/or operating systems, the plurality of adapters may be configured to translate the formatting of the particular application originating message of the tablet PC 18 to a formatting suitable for use with the STB 28. As shown, the communication service 42 includes adapter specific to applications for Skype 48, SMS messaging 50, and Twitter 52 as well as a generic adapter for "other" applications 54. The adapter 44 may include a pass-through port 56 for applications of the tablet PC 18 that are configured to support direct communications with the STB 28, e.g., an application supported by the service provider to communicate with the STB 28 without having to be translated by the adapter 44. The adapter 44 may include a selective switch (not shown) or other element operable to automatically route incoming messages to the appropriate adapter.

The communication service 42 may include a communication protocol service element 60 operable to facilitate managing protocol signaling requirements for the various service provider devices 16 having messaging capabilities serviced through the communication service 42. The communication protocol service element 60, for example, may be configured to support Enhanced Television (ETV) Integrated Signaling Stream (EISS) based communications with the STB 28. The adapter 44 may be configured to translate the received messaging into a format suitable for transport within the particular signaling protocol used to communicate with the STB 28, e.g., EISS. While not shown, the communications protocol service 60 may optionally include a selector switch or other feature to facilitate selecting appropriate protocol routing feature/adapter for directing outputs of the various adapters 44 to a protocol element operable to support communications with the desired STB 28.

This adapter-based architecture 40 may be beneficial in supporting one-way or two-way communications between the tablet PC 18 (consumer device) and the STB 28 (service provider device). The plurality of adapters 48, 50, 52, 54 may be automatically selected according to the received messages to facilitate bi-directional translation of the messages depending on the operating characteristics, format requirements, and communication protocols of the intended recipient. In the event response messages are received or desired, the adapters 48, 50, 52, 54 may be configured to facilitate the communication thereof in order to enable the interactivity contemplated by the present invention. The communications service 42 is shown to support messaging between a single consumer device 18 and a single service provider 16 for exemplary-limiting purposes. The present invention fully contemplates the communication service simultaneously supporting communications between any number of consumer devices 18 and any number of service provider devices 16.

The adapter-based architecture 40 shown in FIG. 2 is one exemplary aspect of the present invention where adapters are selectively chosen to facilitate message display at the STB 28.

Figure 3:
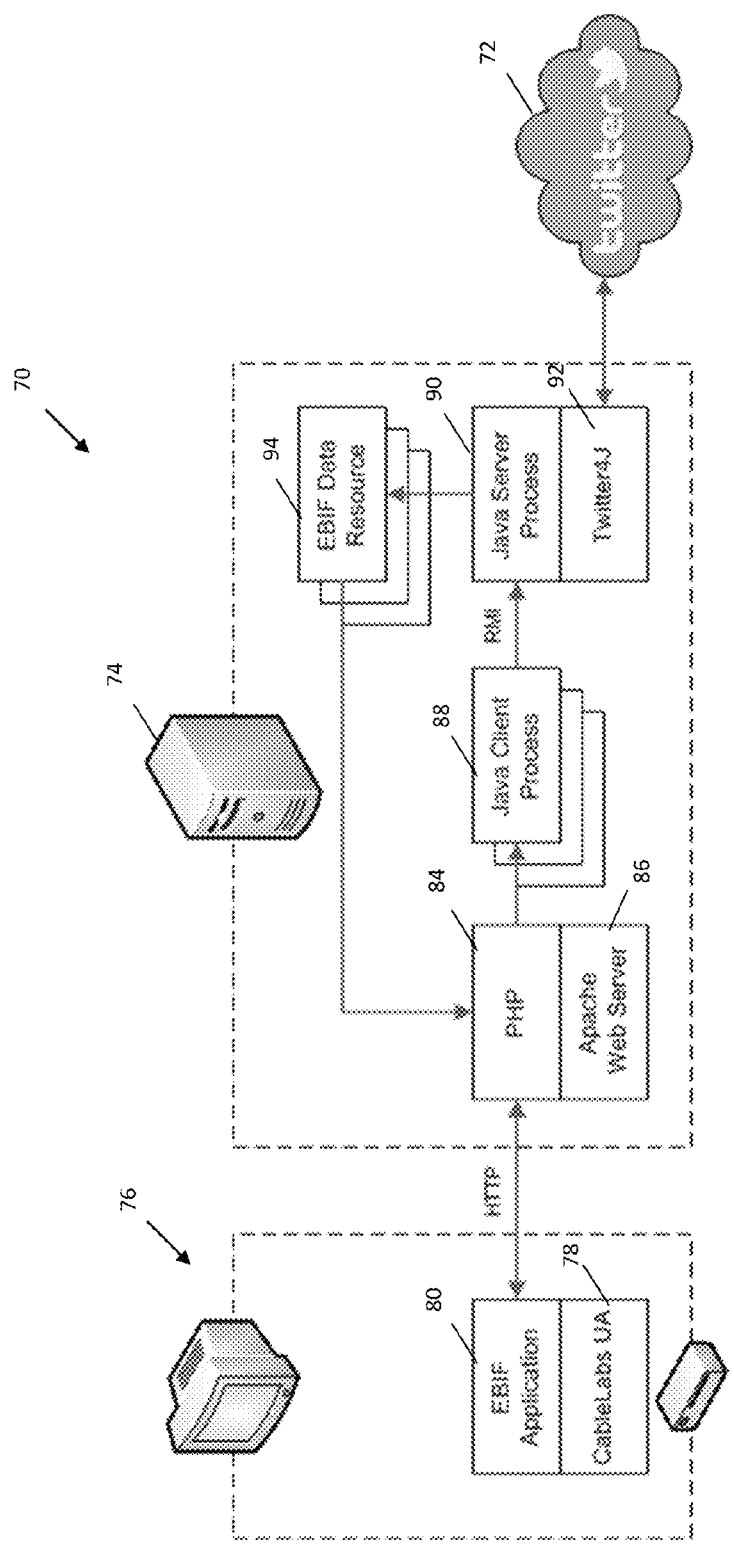
FIG. 3 illustrates a Java-based architecture as contemplated by one non-limiting aspect of the present invention.

FIG. 3 illustrates a Java-based architecture 70 as contemplated by one un-limiting aspect of the present invention. The Java-based architecture 70 may be configured to facilitate operations generally similar to those described above with respect to supporting communications between the public and private domains of the service provider device 76 and the consumer device 18. Rather than illustrating a messaging source to be a tablet PC, FIG. 3 illustrates the to-be-displayed messages originating from an application 72 residing on a server 74 of a service provider, which for exemplary non-limiting purposes is shown to be a Twitter application 72. The Twitter application 72 may be configured to provide messages according to filtering instructions received from the service provider device 76, which for exemplary non-limiting purposes is shown to be a user agent (UA) 78.

The UA 78 may be a STB or other device operable to facilitate interacting services with a television. The UA 78 may include a resident interactive application 80, such as but not limited to the EBIF application defined by OC-SP-ETV-BIF1.0406-110128, the disclosure of which is hereby incorporated by reference in its entirety. The EBIF application 80 may be configured to generate a filter in response to user inputs to the UA 78. The filter may specify specific information desired by the user for display during viewing of a television service through the television, e.g., the filter may specify search criteria for advertisements to be scrolled along the bottom portion of the screen during television viewing or within window 24 shown in FIG. 1. The filter may be processed by the Twitter application 72 such that the Twitter application 72 responds with Twitter posts from its members matching the criteria so that the post can be displayed at the television 76.

The EBIF application 80 may be configured to generate an HTTP post to the server 74. That HTTP post may include data reflective of the desired filter. The HTTP post may be processed with a PHP element 84. The PHP element 84 may be a scripting element operable to recover the search requirement specified within the filter. The PHP element 84 may be included as part of an Apache Web server 86 or other suitable hosting vehicle having capabilities sufficient to open and/or support communications with the EBIF application 80. A Java client process 88 may communicate with the PHP element 84 to facilitate interfacing data recovered through the scripting process with a Java server process configured to interface with a Twitter application program interface (API) 92. A remote method invocation (RMI) may be used to facilitate the transmission between the Java client process 88 in the Java server process 90.

The Java server process 90 may be configured to facilitate formatting the search criteria specified within the filter according to the particular formatting requirements of the Twitter application 72. The Twitter API 92 may issue a request to the Twitter application 72 for posts related to the search criteria specified within the filter upon receipt of corresponding instructions from the Java server process 90. The Twitter application 72 may then execute various operations to collect desired data and information and to package that information within one or more messages returned to the Twitter API 92. The response messages originating from the Twitter application 72 may be those intended for display on the television. The Java server process 90 may be configured to perform operations necessary to format the response messages for output as an EBIF data resource 94.

The EBIF data resource 94 may be an executable file or set of instructions for use with the EBIF application 80 residing on the UA 78. The EBIF data resource 94 may be operable in cooperation with the EBIF application 90 to facilitate displaying the response message, such as in the manner described above and illustrated in FIG. 1. The EBIF data resource 94 may be transmitted to the PHP element 84. The PHP element 84 may then transmit the EBIF data resource 94 to the EBIF application 80 through an HTTP communication, such as through an HTTP post. The EBIF application 80 may be configured to recover the necessary information for the EBIF data resource 94 transmitted through the HTTP post in order to facilitate the desired display of the response message.

As supported above, one non-limiting aspect of the present invention contemplates using an unbound application running on the STB to enable creating and sending one-way instant messages, or pages, to the STB that will appear on the TV. This may include an application concept where message are created on an IP-enabled device, sent to a server in the MSO cloud, and relayed to an unbound listener app running on the targeted STB. This could be implemented using an unbound EBIF application, an unbound tru2way application, or even a proprietary listener application on the STB device. One benefit of this functionality is to be able to create short messages on an IP-enabled device and relay it through the MSO cloud to the STB to be displayed on the TV, including device discovery and addressability, to allow a user on an IP device to find and target messages to a particular STB.

One non-limiting aspect of the present invention contemplates deploying IP remote capabilities that enable consumers to change channels, launch VOD, and set recordings, all which result in messages sent from an IP-enabled device which is paired to one or more STBs in the home and optionally extend extending these deployments with added functionality for the consumer. This could be extended to support various messaging services as end-points, such as Skype, SMS, or AOL. The IP remote Web Server would proxy a standard Skype, SMS, or AOL client and relay the communications to the STB app. This could support bi-directional communications as well, where responses could be sent from the STB back to the messaging server.

One non-limiting aspect of the present invention contemplates a model that allows a service provider to support messaging services from a non-cable device to a cable device, using proprietary protocols between the service provider and the service provider device. These private protocols may be necessary in order to appropriately manage the proprietary communications mechanism in place along that link. An adapter layer may be configured to allow any number of external messaging protocols to be supported, including proprietary ones sent end to end via Service Provider applications (SP portal) on consumer devices. Optionally, each adapter may be configured to translate a message to and from the service provider proprietary protocol to another specific protocol. This capability can be used to send messages to people viewing television in their home. For example "Time to come to the kitchen for dinner". Optionally, this use of an IP remote concept can be tailored to primarily utilize the downstream path so that there is less concern about overloading the upstream from the STB. This provides added value to the IP remote application that is being deployed by cable operators or other system operators While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of facilitating television displayed messaging comprising:
   receiving an message desired for display on a television;
   determining a type of application operating on the television to support message display on the television;
   selecting an adapter to format the message according to the type of application operating on the television, the selected adapter being chosen from a plurality of adapters operable to facilitate formatting messaging for various types of applications;
   formatting the received message with the selected adapter; and
   transmitting the formatted message to the television for display.

2. The method of claim 1 further comprising receiving the message from a mobile device that is unable to communicate directly with the television.

3. The method of claim 1 further comprising receiving the message from a server connected to the Internet.

4. The method of claim 1 further comprising transmitting the formatted message according to at least one of Enhanced TV Binary Interchange Format (EBIF), tru2way, and Open-Cable Application Platform (OCAP).

5. A method of facilitating television displayed messaging comprising:
   receiving a post from a user agent associated with a television, the post specifying a messaging filter;
   parsing the post to recover the messaging filter;
   transmitting the messaging filter to a remote IP enabled device having information associated with the messaging filter;
   receiving an IP formatted message from the IP enabled device having information corresponding with the messaging filter;
   packaging the IP formatted message as a data resource operable with the user interface, the data resource specifying instructions for use by the user agent in displaying the message; and
   transmitting the data resource to the user agent, the user interface following the instructions included in the data resource to display the message.

6. The method of claim 5 wherein the post is formatted according to the HTTP.

7. The method of claim 5 wherein the post is parsed according to PHP.

8. The method of claim 5 wherein the data resource is non-IP formatted.

9. The method of claim 5 wherein the data resource is EBIF formatted.

10. The method of claim 5 wherein the IP enabled device is a tablet PC that wirelessly communicates the IP formatted message over the Internet and the user agent is a set-top box that communicates over a cable to a cable television service provider in order to receive the data resource.

11. A method of facilitating instant messaging between a wireless device and a set-top box (STB), the STB being configured to facilitate viewing of television related signaling on a television, the wireless device being operable to facilitate communications over a first network, the STB being operable to facilitate communications over a second network, the wireless device being unable to communicate directly with the STB over the second network, the method comprising:
   receiving an instant message originating from the wireless device, the instant message being transmitted over the first network according to a first messaging format of a first network protocol;

converting the instant message from the first messaging format to a second messaging format; and transmitting the instant message with the second messaging format to the STB over the second network according to a second network protocol associated with the second messaging format, the STB automatically displaying the instant message on the television while television related signaling is being viewed.

12. The method of claim 11 wherein the first network protocol is Internet Protocol (IP) and the second network protocol is Enhanced Television (ETV) Integrated Signaling Stream (EISS).

13. The method of claim 12 wherein the second messaging format is Enhanced TV Binary Interchange Format (EBIF).

14. The method of claim 11 wherein converting the instant message from the first messaging format to the second messaging format includes selecting an adapter from a plurality of available adapters, the plurality of available adapters being configured to convert the instant message from the first messaging format to one of a plurality of second messaging formats, the second messaging format thereby corresponding with the one of the plurality of second messaging formats associated with the selected adapter.

15. The method of claim 14 wherein the plurality of available adapters includes separate adapters for at least each of Enhanced TV Binary Interchange Format (EBIF), tru2way, and OpenCable Application Platform (OCAP).

16. The method of claim 11 wherein the instant message is transmitted to the STB over the second network within a transport stream used to transport the television related signaling to the STB.

17. The method of claim 16 wherein the transport stream is Moving Picture Experts Group (MPEG).

18. The method of claim 11 further comprising the STB displaying the instant message on the television as a textual overlay, the texture overlay displaying alphanumeric characters specified in the instant message over the television signaling such that the television signaling appears behind alphanumeric characters.

19. The method of claim 18 wherein the television signaling appearing behind the alphanumeric characters is frozen until a user response to display of the instant message is received through the STB.

20. The method of claim 19 further comprising specifying a plurality of responses within the instant message, wherein the user response is selected from one of the plurality of responses.

* * * * *